United States Patent [19]
Boratynski et al.

[11] 3,912,346
[45] Oct. 14, 1975

[54] DOUBLE-ROW SELF-ALIGNING BEARING

[75] Inventors: Henryk Boratynski, Poznan; Piotr Kobylecki, Warsaw; Zbigniew Kosicki, Poznan; Stanislaw Marchwiak, Poznan; Jozef Marciniak, Poznan, all of Poland

[73] Assignee: Poznanska Fabryka Lozysk Tocznych, Poznan, Poland

[22] Filed: Oct. 19, 1973

[21] Appl. No.: 408,000

Related U.S. Application Data

[63] Continuation of Ser. No. 262,681, June 14, 1972, abandoned, which is a continuation-in-part of Ser. No. 05,869, Jan. 26, 1970, abandoned.

[30] Foreign Application Priority Data
Feb. 6, 1969 Poland .................................. 131583

[52] U.S. Cl. ................. 308/214; 308/6 C; 308/217; 308/218
[51] Int. Cl. ............................................. F16c 33/00
[58] Field of Search ............ 308/6 C, 214, 218, 217

[56] References Cited
UNITED STATES PATENTS

| | | |
|---|---|---|
| 1,907,421 | 5/1933 | Gibbons .............................. 308/214 |
| 1,914,548 | 6/1933 | Wingquist ........................... 308/214 |
| 1,918,677 | 7/1933 | Wingquist ........................... 308/214 |
| 2,128,683 | 8/1938 | Slusser ................................ 308/214 |
| 2,586,406 | 2/1952 | Wallgren ............................. 308/214 |

Primary Examiner—Charles J. Myhre
Assistant Examiner—R. H. Lazarus
Attorney, Agent, or Firm—Karl F. Ross; Herbert Dubno

[57] ABSTRACT

A barrel-bearing comprising an outer race with an inwardly concave cross-section in which a securing ring is anchored in a groove lying along a median plane, perpendicular to the bearing axis. Two rows of roller elements, each with an outwardly concave generatrix, bear against the outer race on opposite sides of the securing ring and are received in respective cages having windows of an outline corresponding to the projections of the roller elements. In addition, the inner race may be provided with annular collars bearing against the opposing flanks of the roller elements.

2 Claims, 12 Drawing Figures

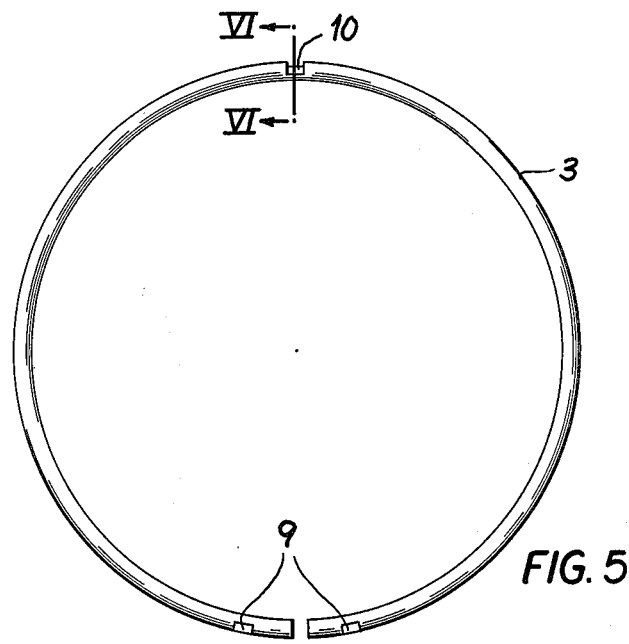
FIG. 6
FIG. 5
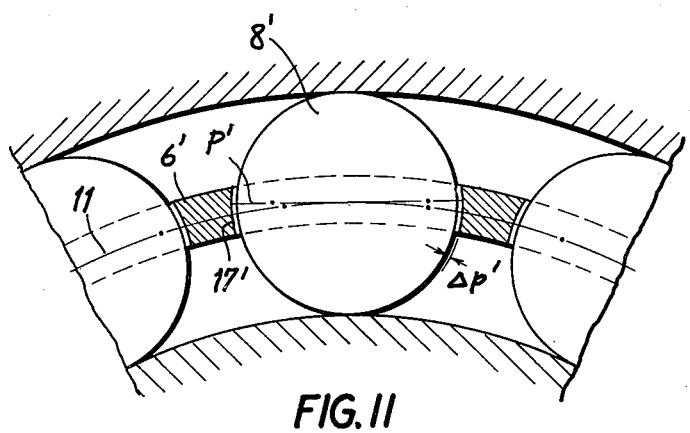
FIG. 11
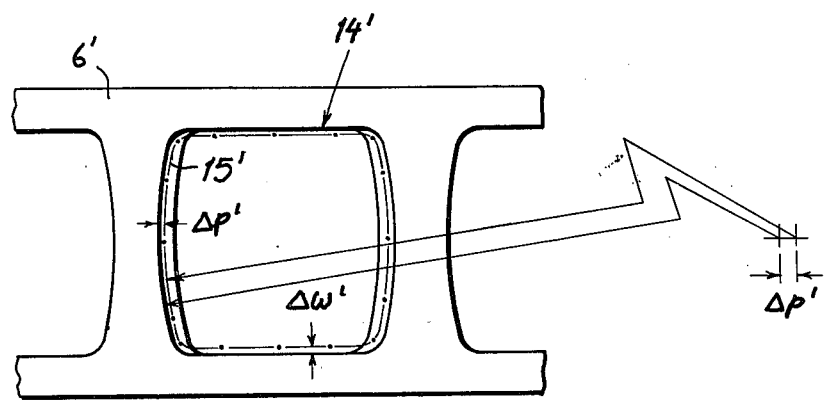
FIG. 12

DOUBLE-ROW SELF-ALIGNING BEARING

This is a continuation of application Ser. No. 262,681, filed June 14, 1972, now abandoned, which is a continuation-in-part of Ser. No. 05,869, filed Jan. 26, 1970 and now abandoned.

FIELD OF THE INVENTION

The present invention relates to a double-row self-aligning roller bearing. More specifically this invention concerns double-row barrel bearings.

BACKGROUND OF THE INVENTION

Hitherto known double-row radial-force barrel bearings are classifiable in two design groups, i.c. barrel bearings with inner races having integral guide collars and with inner races without integral collars. Common elements of both groups include an outer race with a concave rounded raceway and barrel-shaped rollers. Barrel-bearings are also known with internal rings having integral collars and a solid or sheet-metal cage of the open type. Barrel-bearings with internal rings without collars but with a guide ring between the barrels have also been proposed, the guide rings acting as a movable collar guided on the middle cylindrical part of the internal race. A closed cage stamped out of sheet metal is guided at two sides on the movable collar and on the raceway of the internal race.

A common feature of these bearings is the possibility of full displacement of the races or rings with regard to each other. In both solutions described above the cages are designed so that together with the internal ring they secure the barrels against falling out at such an angle of displacement where the barrels lose contact with the raceway of the external ring. In bearings having internal rings with integral collars the securing of the barrels against falling out is a result of the co-operation of the cage and of the collers of the internal ring. In bearings with internal rings having no collars the securing is done by the cage windows which on their flanks are provided with protrusions spaced apart by a distance smaller than the maximal diameter of the respective barrel. When the barrels are inserted the ribs of the cage are subject to elastic strain which disappears after complete assembly of the bearing, so the barrels are held by the cage window protrusions. Double-row self-aligning bearings are known with solid or sheet-metal cages which co-operate with the peripheries of the races, thus securing the balls against falling out at such an angle of displacement of the rings that the balls lose contact with the raceway of the external ring.

The common imperfection of these designs is the necessity of using the cage for separating and guiding the rolling elements, and securing them against falling out. When designing such a cage the factor of securing the rolling elements against falling out is taken into consideration, thereby reducing the effectiveness of the cage as a guiding element. Such securing elements increase the production costs and the difficulty of manufacture due to the necessity of using complicated and precise tools, especially when the cages are stamped of sheet metal. Furthermore, the necessity of using the cage as a securing member does not allow for maximal use of its dimensions to get highest bearing capacity.

There is also known a self-aligning double-row barrel bearing having sheet-metal cages guided by the rolling elements. The ports of such cages are smaller than the barrel diameter, and the outer generating lines of the cages are always situated beneath the generating lines of the pitch cone being formed by the axes of rotation of barrels. The barrels are here protected against falling out by a split expanding ring seated in the raceway of the outer bearing ring between the rows of barrels.

A disadvantage of this design consists in lack of protection against falling apart of the bearing. The bearing designed in this manner has no practical application, as it does not constitute a compact whole, which is easily mountable, and removable in machine and equipment, and moreover, since any excessive mutual angular displacement of the rings causes the bearing as a whole to fall apart.

A common disadvantage of self-aligning double-row barrel bearings with cages guided by the bearing inner ring consists in the necessity of using a cage which besides guiding and spacing the barrels must protect them from falling out, what does not in consequence make it possible to give an optimum form to the cage regarding its minimum weight, and the most favourable distribution of stresses, especially of contact stresses. Since the most effective guiding of barrels is obtained when they keep contact with ports of the cage in the plant extending tangentially to the pitch cone in the axis of rotation of the barrel, its contact line, or plane, determines the desired shape of the portion of cage, being provided with ports.

Known cages must, however, be provided with securing protrusions closing the barrel, lying thus considerably above the plane tangential to the pitch cone in the axis of rotation of the barrel. To fulfill both said conditions, the contact line does not lie in the pitch axis of the cage but considerably lower, near to the inner edge of the port, and the cage itself must be made of sufficiently thick sheet metal, or must have convex generating lines, for it to be possible to make effective securing protrusions.

Known self-aligning double-row barrel bearings, particularly those with symmetrical barrels and cage with securing means, show a disadvantage causing difficulties in mounting them in machines and equipment. The radial clearance of the cage, and the positioning of protrusions of the cage in such a way that they cannot be submitted to wear during working of the bearing, result in the barrels, while having no certain contact with the raceway of the bearing outer ring, get suspended and are difficult to re-insert into the race cap of the bearing outer ring.

The disadvantage of bearings with cages, whose ports are smaller than the barrel diameter is the fact that the contact line between the cage and the barrel does not come at the place of the most effective counteraction to the swivelling moment acting on the barrel. Such a cage leads the barrels considerably and causes an increase of the friction moment in the bearing. The cage has two stiffening collars directed in opposite direction which makes it difficult to make the parts precisely. Such essential disadvantages cause this design to be found inappropriate in practice.

OBJECTS OF THE INVENTION

It is therefore an object of the present invention to provide an improved double-row self-aligning roller bearing.

Another object is the provision of such a bearing with an improved cage that simply and surely guides and separates the bearing elements.

Yet another object is to provide an improved bearing whose cage need not be deformed at all on assembly of the bearing.

SUMMARY OF THE INVENTION

Another object of the invention is to provide a bearing design in which the cage could be made without means protecting the barrels from falling out, and which will allow formation of the port portion of the cage most effectively as a portion exclusively guiding and spacing the barrels with the minimum unitary contact pressures possible.

These objects are attained according to the present invention through the application of a securing ring in a plane perpendicular to the axis of the bearing rotation in the unused middle part of the external race between the rows of rolling elements which are guided on the internal ring at least by means of one collar or at least by means of a collar and a cage. Furthermore, this aim has been achieved through the fact that the cage which is guided at both sides has windows of a shape corresponding to the shape of the orthogonal projection of the barrel on the plane parallel to its axis of rotation taking into consideration the necessary tolerances. The cage guides the barrels by flanks of its windows formed as a representation of the barrel surface taking into consideration the necessary tolerances. The generating lines of the mean cone of the cage, which is guided on both sides, coincide with generating lines (generatrices) of the pitch cone of the bearing created by the axis of the rotation of the barrels or are displaced parallel to them, while generating lines of the mean cone of the cage, which is guided on the barrels, are displaced in the direction of the inside diameter of the bearing parallel in respect to the generating lines of the pitch cone which is created by the axis of the barrels.

Such a bearing has a main axis of rotation which is that axis which corresponds to the axis of revolution of the inside race of ring. In addition each rolling element defines a rolling axis. The rolling axes define a cone with the main axis of rotation with the apex of the cone being at their intersection point. According to the present invention the cage engages the rollers radially outwardly of the cones defined by their rolling axes. In this manner the most advantageous mechanical advantage to restore the roller from a canted or otherwise misaligned position is obtained. Furthermore, according to another feature of this invention the leading and trailing sides of each roller-receiving window are at least partially straight. More specifically the leading and trailing sides are formed as semicylindrical surfaces at least outwardly of the above-mentioned cone defined by the rolling axis, the semicylindrical surfaces of each window having axes of revolution which are parallel to a plane defined by the respective rolling axis and the bearing's main axis of rotation.

The linear contact is localized in the axis of symmetry, or near it, of the cage thickness, and the surface contact is realized on one or both sides of said axis. With such a design and with linear contact the outline of the port corresponds with the orthogonal projection of the barrel on a plane parallel to its axis of rotation, the radius of curvature of the port being equal to that of the barrel, and the origin of the radius is displaced by the dimension of play which form the front side of the barrel the radius is increased by the dimension of play.

According to another feature of the present invention the leading and trailing flanks are only formed as semicylindrical surfaces as described above radially outwardly of a plane orthogonal to the plane described immediately above and intersecting this plane at the respective rolling axis.

The bearing according to the invention simplifies the design of the cage for the double-row barrel bearing because the cage does not need to secure the barrels against falling out. This brings production costs down. The elimination of the securing function of the cage enables advantageous contact of the window flanks with the barrels.

As for self-aligning double-row cageless barrel bearings, the invention makes it possible to employ practically self-aligning cageless bearing in many new applications, since such a design constitutes a compact whole which is easily mountable and removable in machines and equipment.

Application of a securing ring in the non-working portion of the raceway of the bearing outer ring prevents such a mutual swivelling of the bearing rings which in the course of mounting might cause it to fall apart. Thus the necessity of reassembly of the bearing by the user is eliminated, therefore excluding any possibility of mistaking the parts of each other which, owing to accurate dimensional matching of said parts, is of decisive importance for the advantages of the bearing as to its usability, determined by the accuracy of rotation, carrying capacity, and like.

As for self-aligning two-row barrel bearings with cages, the invention improves their design, as the cage needs no means for protecting the barrel against fallin out. This reduces the difficulty in fabrication and lowers manufacturing costs.

The elimination of protecting means from the cage allows obtention of the most favorable contact of the side surface of the port with the barrel and the most effective counteracting of the swivelling moment acting on the barrels. The contact line secured by this design extends in the axis of symmetry of the thickness of material in the port portion of the cage, or near to this axis, and simultaneously in the plane tangential to the pitch cone of the axis of rotation of the barrel. This allows shaping of the cage with a form and thickness determined by the strength conditions necessary for effective guiding and spacing of the barrels. This makes it possible to make the cages from thinner material, using the shortest generating line for the port portion, thus simplifying the manufacturing process. An essential advantage is the reduction of the cage weight and the fact that the cage does not undergo any deformation during assembly of the bearing.

A further improvement of the design of the cage is involved in the modification in which the linear contact of the rib with the barrels is replaced by a surface contact. This design is characterized by reduction of the unitary pressures between the ribs and the barrel, causing thus a reduction of the wear and tear of cooperating surfaces. The constructional dimensions of the elements determined in this way do not make it possible for the barrels to take a warped or canted position in relation to the main axis of rotation of the bearing, which is a fundamental condition of proper operation of the bearing having a repercussion on its bearing capacity and life.

DESCRIPTION OF THE DRAWING

The above and other objects, features, and advantages will become apparent from the following, reference being made to the drawing in which:

FIG. 5 shows a side view of the securing ring;

FIG. 6 shows a cross section along the line VI—VI of the securing ring of FIG. 5;

FIGS. 11 and 12 are views similar to FIGS. 7 and 8 through yet another bearing according to the present invention.

SPECIFIC DESCRIPTION

Figure 1:
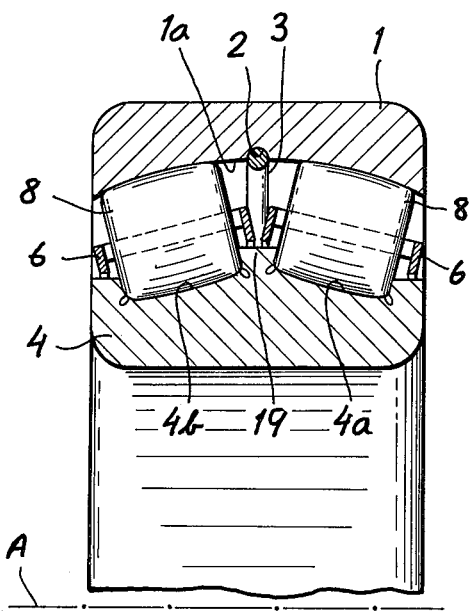
FIG. 1 is a cross section through a barrel bearing whose inner race has an integral collar.

As seen in FIG. 1 a self-aligning barrel bearing has an outer ring 1 formed with a raceway 1a of circularly arcuate cross section having a center of curvature lying on the main bearing axis A. An inner race 4 is formed with a pair of raceways 4a and 4b which are both inclined outwardly down toward the main bearing axis A and with an inner collar 19 separating the two raceways 4a and 4b. A plurality of barrel-shaped rollers 8 are received between the raceway 1a and the raceways 4a and 4b, with two separate cages 6 holding them apart. A securing ring 3 is received in a peripheral groove formed in the raceway 1a so that the barrels 8 cannot fall out of the bearing as a result of excessive tilting of the race 1 relative to the race 4.

Figure 2:
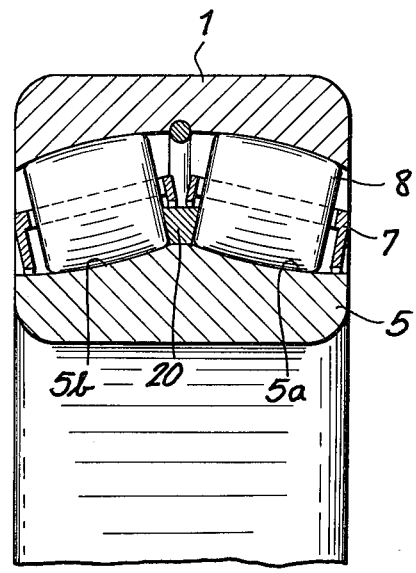
FIG. 2 is a similar section through a barrel bearing whose inner race has no collar but which is provided with a movable guiding collar.

The embodiment of FIG. 2 is substantially identical to that of FIG. 1 except that there is provided a nonintegral rib or collar 20 on the inner race 5. The inner raceways 5a and 5b are also merely curve guides for the barrels 8, with the cage 7 being formed correspondingly.

Figure 3:
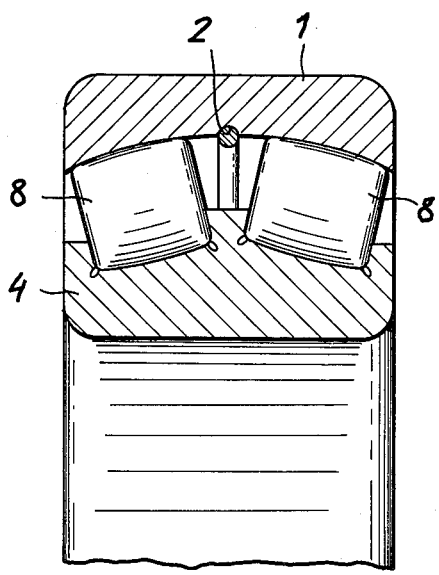
FIG. 3 shows in cross section a barrel bearing with no cage.
Figure 4:
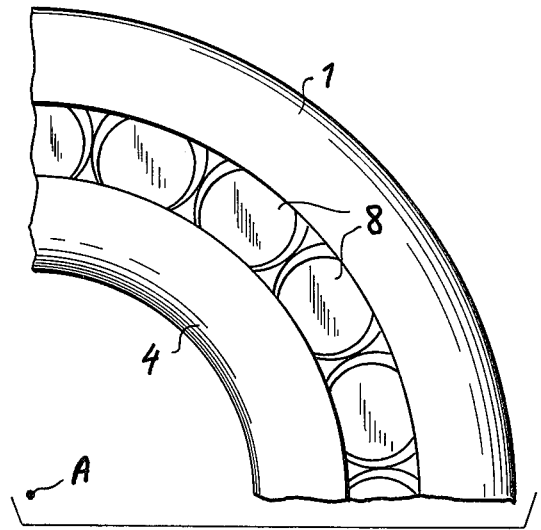
FIG. 4 shows in elevation the part of the bearing of FIG. 3 as seen from the front.

The bearing of FIGS. 3 and 4 is substantially identical to that of FIG. 1, except that no cage is provided so that the barrels touch one another.

FIGS. 5 and 6 show the split ring 3 which prevents the bearings of FIGS. 1–4 from falling apart. This ring is formed with an oblique notch 10 on one side and adjacent its split on the other side with a similar pair of notches 9. In order to take the bearing apart some tool such as a screwdriver is inserted in the groove 2 under any of the notches 9 or 10 and the ring 3 is pried out.

Figure 7:
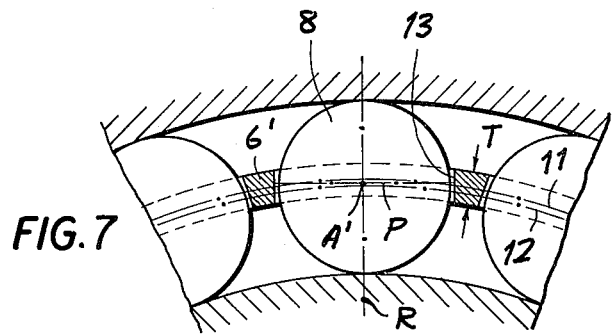
FIG. 7 is a cross section through another bearing according to the present invention.
Figure 8:
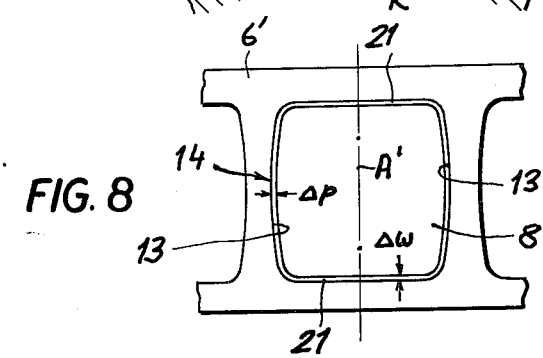
FIG. 8 is a top view of the cage of FIG. 7.

A cage 6' is shown in FIGS. 7 and 8 which is formed with a plurality of windows 14 which have virtually the same outline as the barrels 8, that is, of a projection of the barrels 8 taken radially to their axes A' of revolution. Each window 14 has leading and trailing edges 13 which are curved, whereas its lateral sides 21 are straight. These curved sides 13 are semicylindrical with axes of revolution parallel to a radial plane R extending from the axis A through the axis A' of the respective barrel 8. The imaginary cone defined by all of the axes A' is shown at 12 and the imaginary cone formed by the generally frustoconical cage 6 is shown at 11. The line 11 is radially outside the line 12 indicating that the cage 6' lies more outside than inside the cone of the barrel rotation axes A'. More specifically FIG. 7 shows that the sides 13 are orthogonal to a plane P orthogonal to the above-described radial plane R and including the axis A'.

Figure 9:
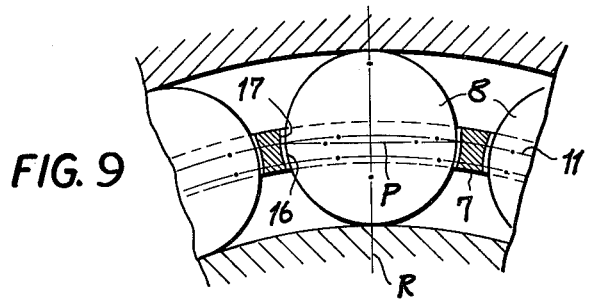
FIG. 9 is a cross section through yet another bearing according to the present invention.
Figure 10:
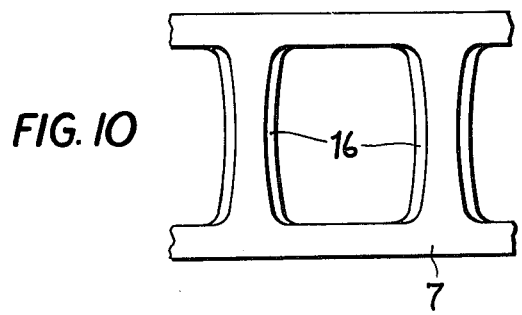
FIG. 10 is a top view of the cage of FIG. 9.

FIGS. 9 and 10 show that the leading and trailing edges 13' of a cage 7 are curved to match the contours of the barrels 8 radially inwardly of the plane P, but outwardly of this plane P they are straight and semicylindrical as in FIGS. 7 and 8. Thus each edge 13 has a radially inward portion 16 which is concave in two directions, and a portion 17 which is concave toward the barrel parallel to its axis A' but otherwise straight.

In FIGS. 7–10 the sides 13 are spaced from the leading and trailing edges of the barrels 8 by a distance $\Delta p$, and the sides 21 by a distance $\Delta w$, both equal to at least half of the thickness T of the cage 6'.

It should be clear that bearings so made tend to align rapidly with the least amount of wear due to friction between the cage and the barrels. In addition the cage need not be deformed in the least for assembly or disassembly of the bearing.

A fragmentary sectional view of the cage 6' contacting with the barrel 8' over the surface 17' which is a representation of the surface of the barrel 8', underneath the plane P' tangential to the pitch cone 11', is shown in FIG. 11. Above the plane P' the outline 16' of the port corresponds with the outline 13' of the orthogonal projection 15' of the barrel 8' on a plane parallel to its axis of rotation, the radius of curvature of the port being equal to the radius of curvature of the barrel, with the origin of the radius being displaced by the dimension of play $\Delta p'$, while from the front side of the barrel the outline 16' is increased by the dimension of play $\Delta w'$ FIG. 12.

We claim:

1. A double-row self-aligning roller bearing, comprising:

an outer annular member formed internally with an outer race of spheroidal configuration and inwardly concave in cross section;

an inner annular member coaxial with said outer annular member and formed with a pair of axially spaced inner races on opposite sides of a median plane passing through said member perpendicular to the axis thereof, said inner race being of outwardly concave cross section;

a respective array of barrel rollers received in each inner race and rollingly engaging said outer race, said arrays being disposed on opposite sides of each plane, each of said roller arrays having a cone of center axes of the respective barrel rollers;

a spring securing ring received in but projecting inwardly from said outer race in said plane, said inner member being formed unitarily with respective outwardly projecting annular shoulders forming collars flanking opposite sides of each array; and a pair of frustoconical cages each formed with a plurality of windows along the respective cone and receiving the rollers of a respective array, said barrel rollers each having a rotation axis defining upon rotation of said inner race relative to said outer race about a main bearing axis, a pair of oppositely directed cones, said cages having outer portions lying partially radially outside and inner portions inside said cone, said windows having the profiles of the barrel rollers to be inserted therein along the plane of each window, the portions of the side surfaces of each window lying on both sides of a plane passing through the center of the window being curved in the circumferential direction and being surfaces with straight-lines generatrices which are perpendicular to the last mentioned plane but parallel to said median plane.

2. A double-row self-aligning roller bearing, comprises:

an outer annular member formed internally with an outer race of spheroidal configuration and inwardly concave in cross section;

an inner annular member coaxial with said outer annular member and formed with a pair of axially spaced inner races on opposite sides of a median plane passing through said member perpendicular to the axis thereof, said inner race being of outwardly concave cross section;

a respective array of roller elements received in each inner race and rollingly engaging said outer race, said arrays being disposed on opposite sides of said plane, each of said roller arrays having a circle of centers of the respective roller elements;

a spring securing ring anchored in but projecting inwardly from said outer race in said plane, said inner member being formed with respective outwardly projecting annular shoulders forming collars flanking opposite sides of each array; and a respective cage with a single row of apertures in the cage connecting the rollers of the respective arrays, said apertures having the profiles of the roller elements to be inserted therein along the plane of each aperture, those portions of the side surfaces of said apertures lying on the outer side of the plane through the center of the aperture, being surfaces with straight generatices which are perpendicular to the axial plane, those portions of the side surfaces lying on the inner side of the plane through the center of the apertures being curved in the circumferential direction and conforming to the profile of the respective roller element.

* * * * *